United States Patent
Essers et al.

(10) Patent No.: US 10,316,107 B2
(45) Date of Patent: Jun. 11, 2019

(54) HYDROTHERMALLY MODIFIED STARCH

(71) Applicant: Nederlandse Organisatie voor Toegepast-Natuurwetenschappelijk Onderzoek TNO, Delft (NL)

(72) Inventors: Maurice Karel Hubertina Essers, Delft (NL); Johannes Wilhelmus Timmermans, Delft (NL); Jan Matthijs Jetten, Delft (NL); Theodoor Maximiliaan Slaghek, Delft (NL); Alida Anna Catharina Maria Oudhuis, Delft (NL); Ricardo Nagtegaal, Delft (NL)

(73) Assignee: N.V. NEDERLANDSCH OCTROOIBUREAU, The Hague (NL)

( * ) Notice: Subject to any disclaimer, the term of this patent is extended or adjusted under 35 U.S.C. 154(b) by 22 days.

(21) Appl. No.: 14/427,957

(22) PCT Filed: Sep. 16, 2013

(86) PCT No.: PCT/NL2013/050668
§ 371 (c)(1),
(2) Date: Mar. 12, 2015

(87) PCT Pub. No.: WO2014/042537
PCT Pub. Date: Mar. 20, 2014

(65) Prior Publication Data
US 2015/0201654 A1 Jul. 23, 2015

(30) Foreign Application Priority Data
Sep. 14, 2012 (EP) .................................. 12184454

(51) Int. Cl.
*C08B 30/00* (2006.01)
*C08B 30/12* (2006.01)
*A23L 29/219* (2016.01)

(52) U.S. Cl.
CPC ............ *C08B 30/00* (2013.01); *A23L 29/219* (2016.08); *C08B 30/12* (2013.01); *A23V 2002/00* (2013.01)

(58) Field of Classification Search
CPC ..... C08B 30/12; C08B 30/00; A23L 1/05223; A23V 2002/00
(Continued)

(56) References Cited

U.S. PATENT DOCUMENTS 5,725,676 A * 3/1998 Chiu .................... A21D 2/186
127/34
6,221,420 B1 4/2001 Thomas et al.
(Continued)

FOREIGN PATENT DOCUMENTS

WO WO-96/22311 A1 7/1996

OTHER PUBLICATIONS

International Search Report of PCT/NL2013/050668 dated Oct. 31, 2013.

*Primary Examiner* — Subbalakshmi Prakash
(74) *Attorney, Agent, or Firm* — Gilberto M. Villacorta; Sunit Talapatra; Foley & Lardner LLP

(57) ABSTRACT

A process for producing thermally inhibited starch is described resulting in a viscostable starch product. The process comprises providing an alkaline starch having a pH, when measured in a 20% (w/v) aqueous dispersion, between 9.1 and 11.2, adjusting the water content of the starch to between 2 and 22 wt. %, heating the starch between 130 and 190° C., especially between 140 and 180° C., for a sufficient time and at a sufficient pressure for the inhibition of the starch to be initiated before the water content has reached a level of 1 wt. % and before the pH has reached a value of
(Continued)

9, continuing heating the starch between 140 and 190° C. until viscostability is achieved, and cooling and optionally further processing the starch.

17 Claims, 2 Drawing Sheets

(58) Field of Classification Search
USPC .......................................... 426/661; 536/162
See application file for complete search history.

(56) References Cited

U.S. PATENT DOCUMENTS

2001/0017133 A1     8/2001   Chiu et al.
2010/0261892 A1*   10/2010   Weisser .................. C08B 30/12
                                                                                                                             536/102

* cited by examiner

HYDROTHERMALLY MODIFIED STARCH

CROSS-REFERENCE TO RELATED APPLICATIONS

This application is the National Phase of International Patent Application No. PCT/NL2013/050668, filed Sep. 16, 2013, published as WO 2014/042537, which claims priority to European Application No. 12184454.2, filed Sep. 14, 2012. The contents of which are herein incorporated by reference in its entirety.

The invention relates to the production of hydrothermally modified starch, which is a starch having stable viscosity behaviour as a result of a thermal treatment. Such hydrothermally modified starches find use in food applications.

BACKGROUND

Starch is extensively used in food industry, not only for its energy content (carbohydrates), but also as a thickening or emulsifying agent. Native starches, however, require pre-treatment in order to have the required thickening and similar properties in situ. Starches modified by chemical crosslinking, such as phosphate crosslinking have the required in situ properties, such as shear, acid and heat resistance. However, chemical modification is less desired in food applications, even though some chemical modifications are regarded as safe.

U.S. Pat. No. 6,221,420 discloses a thermally inhibited starch, i.e. a hydrothermally modified starch which is inhibited from returning to its native state. The product is obtained by dehydrating starch to a water level below 1% at a temperature between 100 and 125° C., followed by heat-treating the dry starch at about 140° C., in a fluidized bed. US 2001/0017133 discloses a similar process wherein the starch is also dehydrated at below 125° C. before the inhibition process is started (at 160° C.).

There is a need for providing processes for producing hydrothermally modified starches with improved visco-stability and which are more economical, especially where equipment requirements are concerned.

DESCRIPTION OF THE INVENTION

Figure 1:
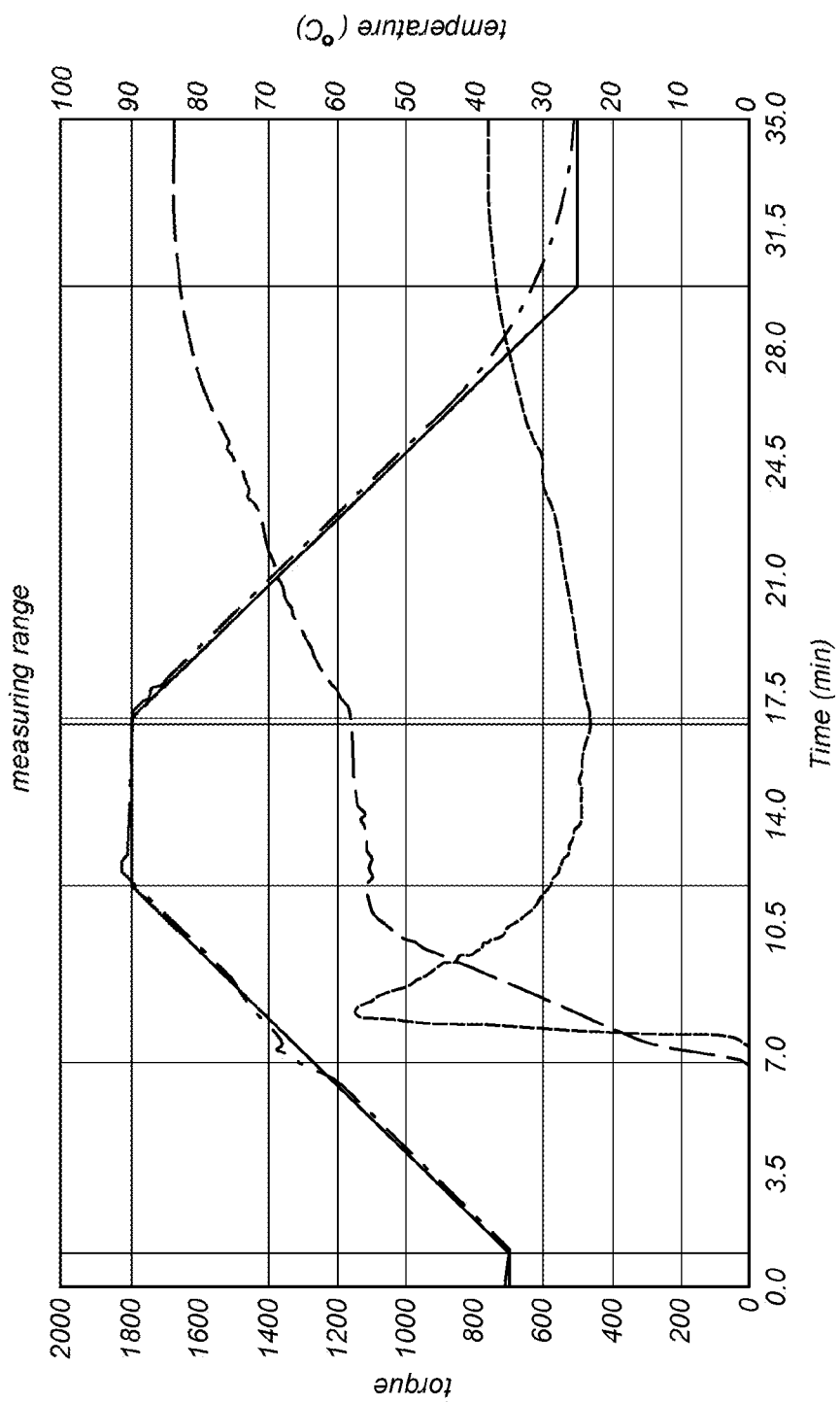
FIG. 1 is a comparison of viscographs of native Eliane (waxy potato) and inhibited Eliane starch (initial pH 11; initial moisture 6%, reaction time was 3 hours at 165° C.).

It was found according to the invention that a process for producing thermally inhibited starch, by heating an alkaline starch at temperatures of e.g. between 120 and 190° C., can be improved in terms of viscosity and viscostability by ensuring that the inhibition process, which is believed to proceed by crosslinking within the starch molecules, has been initiated and progressed to some extent in the presence of sufficient water, i.e. more than 1% water on a weight basis.

Thus the process of thermally inhibiting starch, when carried out in the presence of 2-22 wt. % of water, with moisture control and with pH control, until constant viscosity, results in a viscostable product suitable e.g. as a thickener or emulsifier. The process can be performed in relatively simple equipment, not requiring fluidised beds or the like. Also the use of additives such as surfactants during heat treatment is not necessary and preferably avoided.

Thus, the invention pertains to a process for producing thermally inhibited starch comprising the steps of:
(i) providing alkaline starch having an initial pH, when measured in a 20% (w/v) aqueous dispersion, between 9.1 and 11.2;
(ii) adjusting the water content of the starch to between 2 and 22 wt. %;
(iii) heating the starch having the adjusted water content between 120 and 190° C. while maintaining the water content of the starch above a level of 1 wt. % for a sufficient time and at a sufficient pressure for the inhibition of the starch to be initiated, to form carboxylic acids, said carboxylic acids preferably comprising at least formic acid, before pH drops below 9;
(iv) continuing heating the starch between 120 and 190° C. until viscostability is achieved;
(v) cooling and optionally further processing the starch.

The starch to be used in the process of the invention can be any common type of starch, including maize, potato, tapioca, rice, wheat, etc. The starch may contain at least e.g. 70% (w/w) of amylopectin.

An important feature of the process of the invention is the control of water content and pH during the heat treatment. The starch is allowed to react with water under alkaline conditions at high temperature for a sufficient time to initiate the inhibition (cross-linking) process, while avoiding depolymerisation. Without wishing to be bound to a specific theory, the inventors believe that the initiation of cross-linking results in the production of acidic moieties, which may result in a pH drop. This initiation should occur under alkaline conditions so as to prevent or reduce acid-catalysed degradation processes.

Therefore, the thermal inhibition process should be carried out under such conditions that the water content of the starch, during the heat treatment, remains above 1 wt. % for a sufficient length of time so as to allow the (chemical) inhibition to be initiated, e.g. by the formation of crosslinks.

The conditions and other features for the required moisture control include the following:
- a starting water content, at the start of the thermal treatment, i.e. when the starch has reached the minimum temperature of the inhibition process, of 120° C., 130° C. or better 140° C., which is at least 2 wt. % by weight, or rather at least 3 wt. % preferably at least 4 wt. % by weight;
- a control of the water level during the first phase of the thermal treatment, depending on the chosen equipment (forced water vapour removal or not), in particular by applying a pressure of at least 0.05 bar and at most 0.5 bar;
- pH control as further elaborated below;
- temperature control, especially during the first phase of the heat treatment, i.e. below 190° C., preferably below 180° C.

The moisture control can be monitored by:
- the starting gel point of the starch, which is decreased by at least 0.5° C.;
- formation of acids, in particular formic acid.

In order to have a sufficient water content (water activity), the water content of the starch when entering the heat treatment process (step ii above), i.e. when being above 120° C., is at least 2% (w/w), and if necessary is adjusted to such levels. Preferably, the water content in step (ii) is at least 3%, more preferably at least 4%, most preferably at least 5% (w/w). Water contents above 22% (w/w) do not contribute significantly to the improved viscosity and visco-stability. Preferably, the water content is 15% or less, most preferably 12 or less, or even 10% or less (w/w).

The heat treatment is performed at a temperature between 120 and 190° C. The minimum temperature is preferably at least 140° C., most preferably at least 150° C. The maximum is preferably not above 180° C., most preferably 170° C. or lower.

The initiation of the starch inhibition in step (iii) can be controlled by the starting gel point of the starch, i.e. the temperature at which the starch starts to gel or the crossover point of loss modulus and storage modulus. This can be determined by commonly known methods and means, e.g. using an amyloviscograph. The gel point of the starch as treated in step (iii) is determined using one of such means and methods and should be significant using existing amylography, preferably at least 0.5° C. lower, preferably at least 0.6° C., more preferably at least 0.7° C., most preferably at least 1° C. lower than the gel point of the same starch (but not having been treated according to step (iii), i.e. in native form) using the same means and methods, using the same conditions (pH, water content, pressure etc.). The gel point assessment may for instance be carried out using a viscograph, where the settings presented for the so-called 'acid Brabender' and 'neutral Brabender' in the experimental section could be used as a guide.

Figure 2:
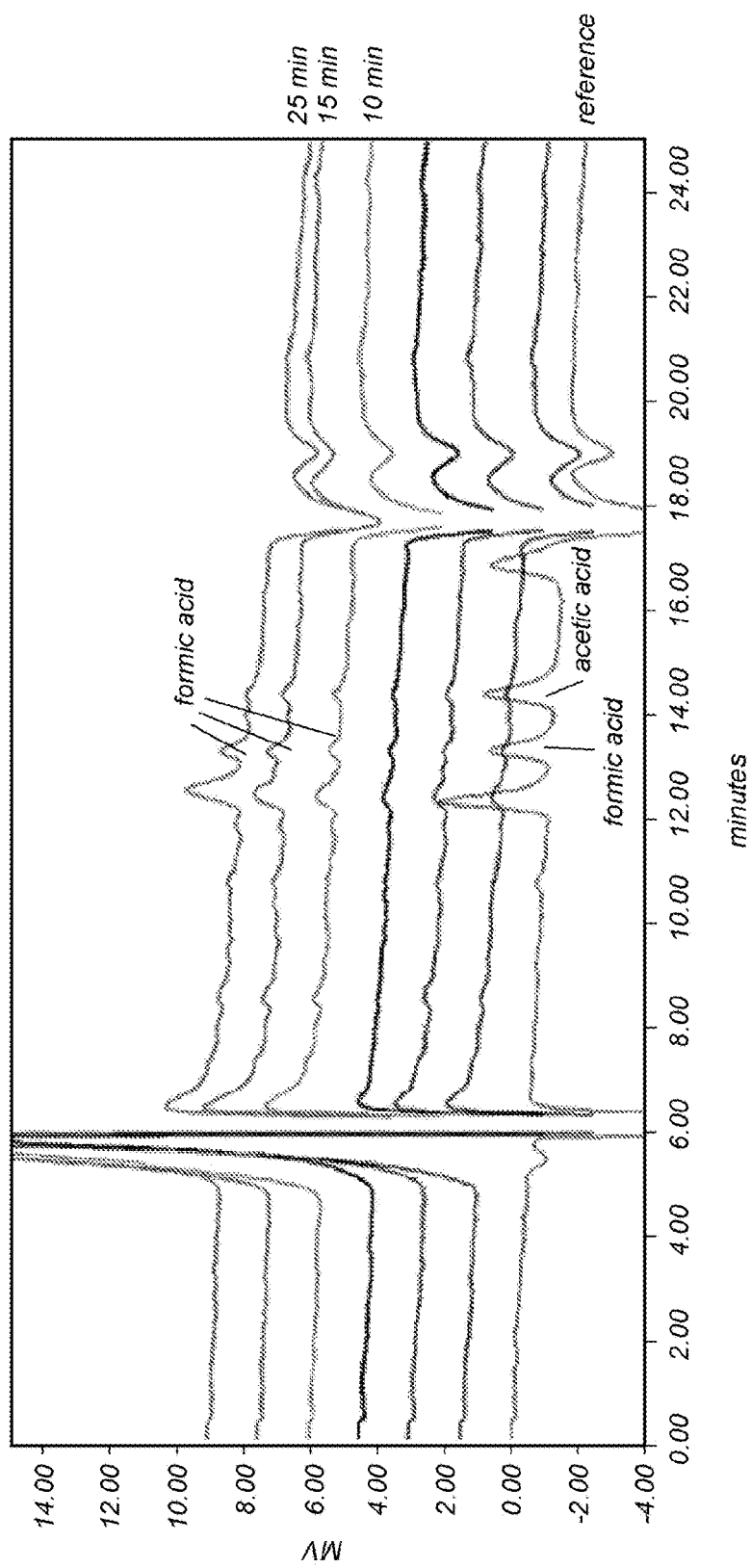
FIG. 2 shows the formation of carboxylic acids during starch dehydration.

The initiation of the starch inhibition in step (iii) realizes the formation of carboxylic acids in the initial stage of the heat treatment. Particularly formic acid can be used as marker for sufficient acid formation. The amount of formic acid can be evidenced by e.g. liquid chromatography, in particular HPLC, wherein a significant peak for formic acid, which may be in the ppm range, is indicative for a sufficient degree of initiation, i.e. completion of step (iii). FIG. 2 shows that this is easy for the skilled person to monitor temperature and pressure in function of time, to control to adjust pH at or above 9 in order to achieve carboxylic acid formation. In a preferred embodiment the heating step (iii) involves maintaining the water content above the desired levels for a sufficient time and sufficient pressure for the inhibition of the starch to be initiated and the formation of detectable amounts of carboxylic acids, preferably formic acid, using HPLC. More preferably the amount of carboxylic acid, preferably formic acid, formed at the imitation of the inhibition of the starch in step (iii)—as for instance measured with HPLC—is at least 1 ppm, more preferably at least 2 ppm, more preferably at least 3 ppm, even more preferably at least 5 ppm.

The initiation of the starch inhibition in step (iii) can also be controlled using the pH. The pH is allowed to decrease to a limited degree during the initial phase of the heat treatment, i.e. before the water level has decreased to 1 wt. %, preferably before the water level has decreased to 2 wt. %, or better, before the water level has decreased to 3 wt. %. Preferably, the pH drop is not to below 9.0, more preferably not below 9.1, most preferably not below 9.2, while it may be with 0.5 unit or even 0.7 unit depending on the starting pH. The pH at the start of the heat treatment is preferably between 9.5 and 11, more preferably between 9.5 and 10.5, more preferably between 9.8 and 10.4. It was found that within this range sufficient carboxylic acids are formed.

The length of the heat treatment depends on the treatment conditions and equipment. The total treatment, i.e. steps (iii) and (iv), may range from a few minutes to several hours, for example from 15 minutes to 8 hours, preferably from 30 minutes to 6 hours, most preferably from 1 to 3 hours. For example, at a temperature of 140° C., the minimum time for step (iii), i.e. until a sufficient initiation of the inhibition reaction has taken place, will be 1 hour, preferably at least 1.5 h, while at 160° it may be 30 minutes, more preferably at least 45 minutes. Steps (ii) and (iv) may be performed at different temperatures or at different other conditions such as pressure, but preferably steps (iii) and (iv) are performed without interruption or change of conditions.

The heat treatment in step (iv) is continued until viscostability has been achieved, in particular in combination with a high peak viscosity and set-back viscosity. Viscostability is indicative of the required degree of inhibition (cross-linking). Viscostability is defined according to the invention as a viscosity which, when measured at 95° C., has a breakdown of viscosity after a hold time of 10 minutes at 95° C., divided by the initial viscosity at 95° C. and multiplied with 100, which is substantially zero %, i.e. which decreases by less than 5%, more preferably less than 1%, even more preferably less than 0.5%, most preferably about 0% upon holding at 95° C. for 10 minutes. While the above conditions are standard for maize or corn starch, for potato starch the viscostability is preferably defined as a viscosity which, when measured at 90° C., has a breakdown of viscosity after a hold time of 5 minutes at 90° C., divided by the initial viscosity at 90° C. and multiplied with 100, which is substantially zero %, i.e. which decreases by less than 5%, more preferably less than 1%, most preferably about 0% upon holding at 90° C. for 5 minutes.

Hitherto, the prior art has not leveled a combination of viscostability and viscosity properties, especially the viscosity level during the holding phase, of chemically crosslinked starch (for example modified by sodium trimetaphosphate (SMTP) or $POCl_3$) for non-chemically crosslinked (i.e. native) starch. Chemically crosslinked starch has the ability to be viscostable, during the holding phase after pasting the starch, at higher viscosity levels, comparable to the level of the peak viscosity of the native starch. The process of the invention enables to match these characteristics but conveniently without the need for chemical crosslinkers.

It is preferred that the final pH during step (iv) does not decrease below 7, more preferably in the range of 7.1-8, more preferred not below 7.2, even more preferably is in the range of 7.2-7.8, most particularly 7.5-7.8 at the end of the reaction.

In a preferred embodiment, heat treatment of steps (iii) and (iv) involves a total heating time of at least 0.5 h, in particular at least 1 h, more preferably between 1 and 4 hours, more preferably 1-3 hours. In one embodiment, heat treatment of steps (iii) and (iv) takes more than 2 hours.

It was found to be advantageous if at least the first part of the heat treatment is carried out with active removal of water vapour. This can be achieved by using a reactor having a forced circulation, for example using an air blower, or by using sub-atmospheric pressures, e.g. below 0.5 bar, more preferably below 0.4 bar (vacuum). However, an excessively low vacuum is not desired, since it requires very long treatment times, and bears the risk of too low water content at the early stages of the heat treatment. Preferably a pressure of at least 0.05 bar, preferably at least 0.1 bar, preferably at least 0.2 bar, more preferably at least 0.3 bar is maintained at the heating conditions of step (iii) (of preferably between 140 and 180° C.). An alternative embodiment involves the use of super-heated steam for heat-treating the starch.

The process of the invention results in a thermally inhibited starch which has an increased and stable viscosity compared to native starch, as a result of crosslinking of the starch. The viscosity during the hold phase can be at least 80%, more preferably at least 90%, especially at least 95%, more particularly at least 100% of the peak viscosity of the corresponding native starch. The final viscosity can even be higher than the initial viscosity, e.g. 105% or even 110% of the initial viscosity or higher. In absolute terms, the viscosity, as measured using a Brabender visco-amylograph at 5.8 wt. % starch (for maize starch) in water at 35° C. is at least 450 mPas, preferably at least 500 mPas.

After the heat treatment (steps (iii) and (iv)), the process of the invention can further comprise a step (v) of washing and drying the heat-treated starch. Other post-treatments can include pH adjustment or mixing with other ingredients.

The process of the invention can be carried out in conventional, relatively inexpensive equipment, such as a dextrinizer, oven, plate dryer, Loedige mixer, or paddle reactor, preferably in combination with water-removing means, such as a blower or a vacuum device. Use of more complex equipment such as fluidized bed reactors are therefore not preferred.

The hydrothermally modified (or inhibited, or moderately cross-linked) starches can suitably be used in applications in which increased and stable viscosity are required. Thus, the starch can be used as a thickener or for providing a pulpy texture to food products. The starches can be used in soups, gravies, sauces, fruit filling, puddings, baby foods and deep fried foods. The starches produced according to the invention have the important advantage of not being chemically modified, and therefore having broader acceptability, both legally and in consumer acceptance.

The invention also pertains to the use of the hydrothermally treated starches as described herein as a food additive, such as thickeners and stabilisers, e.g at levels of between 0.1 and 5 wt. % on total dry weight basis of the particular food product. Such food products containing the treated starches as defined herein, are also an embodiment of the invention.

In summary, a visco-stable starch with a high viscosity level can be obtained under the following conditions:
Dehydration takes place at temperatures between 140 and 190° C.;
Dehydration is enhanced by using equipment that is capable to remove the water (preferably a vacuum system);
The inhibition (after reaching a substantially anhydrous stage) should preferably take place between 140 and 180° C.; more preferably around 160° C.;
Initial pH is between 9.1 and 11.2, and pH drop should be controlled as to allow sufficient carboxylic acids to be formed;
Dehydration of an alkaline starch with a moisture level (between 2-22%) takes place in such a way that carboxylic acids are formed and the starting gel point is lowered, before the water content is decreased to 1 wt. %.

This is further illustrated by the examples below.

EXAMPLES

Materials:
Waxy corn starch was supplied by Ingredion
Waxy potato starch was supplied by AVEBE
0.1N NaOH solution (Aldrich)
Equipment:
Brabender Micro-Amylo-Graph Universal (MVAG) model 803222 supplied by
Brabender GmbH & Co. KG in Duisburg, Germany
Infrared balance Mettler
Rotavapor (Heidolph)
Convection oven (Memmert)
Analytical Methods and Procedures:
Preparation Alkaline Starch.

Starch was suspended in water (100 g of starch in 400 mL of water) under constant stirring with a magnetic stirrer. NaOH solution (0.1 mol/L) was used to adjust the pH to the required level within 15 min. After 1 h of stirring, the pH was measured again and adjusted, if necessary. The suspension was then filtered through a paper filter (Whatman No 4, Whatman International, England). The starch cake was dried overnight at 60° C. in a convection oven (Memmert, Germany). The dried cake was grinded using a coffee grinder (Type F203, Krups, Germany). The resulting starch was subsequently reconditioned to the desired water content at standard temperature (2, 5 and 10% water content).

Inhibition

Inhibition in the examples was achieved through either rotavapor or oven conditions:

Procedure 1:
25 grams of starch was placed in a glass evaporation flask which was connected to a condenser and vacuum pump. The flask was submerged in an oil bath at a temperature of 164° C. The reaction time was set to 1 to 4 hours. The inhibition reaction was stopped by removing the oil bath and allowing the starch to cool.

Procedure 2:
40 grams of starch was placed in an alum dish and placed in a convection oven at an elevated temperature (160-170° C.). The inhibition reaction was stopped by removing the alum dish out of the oven and allowing the starch to cool.

Viscosity; Viscograph

The viscosity was determined according to standardized conditions. There is a slight change between the method for corn and potato starch:

Corn Starch: Sample Preparation and Set Up Neutral Brabender Viscograph
Sample weight: 6.78 g anhydrous grams
Total charge weight: 110 grams
solids: 5.8%
Matrix: demineralized water
Speed: 250 (1/min)
Measuring range: 235 cmg The Brabender temperature was set at 35° C. Within a time frame of 11 minutes the temperature was raised to 95° C. This temperature was held for 10 minutes. Then the starch paste was cooled to 35° C. in 11 minutes. After 5 minutes at 35° C. the measurement was finished.

Potato Starch: Sample Preparation and Set Up Neutral Brabender Viscograph
Sample weight: 5.5 g anhydrous grams
Total charge weight: 110 grams
solids: 5%
Matrix: demineralized water
Speed: 250 (1/min)
Measuring range: 235 cmg The Brabender temperature was set at 35° C. Within a time frame of 11 minutes the temperature was raised to 90° C. This temperature was held for 5 minutes. Then the starch paste was cooled to 35° C. in 11 minutes. After 5 minutes at 35° C. the measurement was finished.

pH pH; was measured at 20% dry solids in demineralized water.

Assessment of Organic Acid Formation: HPLC 500 mg of starch samples was suspended in 10 mL MilliQ water. By use of a roller equipment the sample was shaken for 30 min. Then the sample was centrifuged at 9000 G. The supernatant was collected and used for further analyses. A Biorad HPX87-H column (7.5 mm×30 cm) was used. The system was eluted with MilliQ 0.01 M $H_2SO_4$ at 60° C. and a flow rate of 0.5 mL/min. Samples were injected at 20 µl. A Waters 2410 RI detector was used for determining the concentration of the eluting fractions.

Example 1: Inhibition of Waxy Potato Starch (Type 'Eliane')

For these set of experiments waxy potato starch was used as base material, and it was subjected to the above/outlined procedure 2 to perform the inhibition reaction. The initial pH was 11, the temperature during the treatment was 165° C. Reaction time (h) and moisture level were varied. The breakdown viscosity was then evaluated by use of the neutral Brabender procedure as detailed above. The results are represented in Table 1 here below.

TABLE 1

Breakdown viscosities

| Exp. | Initial moisture level (%) | Time (h) | Final pH | % Breakdown Viscosity |
|---|---|---|---|---|
| 1 | <1 | 1 | 7.8 | 23 |
| 2 | <1 | 2 | 7.3 | 28 |
| 3 | <1 | 3 | 7.1 | 12 |
| 4 | 6.3 | 1 | 8.3 | 24 |
| 5 | 6.3 | 2 | 7.4 | 24 |
| 6 | 6.3 | 3 | 7.2 | 0 |
| 7 | 10.7 | 1 | 8.1 | 29 |
| 8 | 10.7 | 2 | 7.6 | 22 |
| 9 | 10.7 | 3 | 7 | 0 |

It showed that inhibition was most pronounced at an initial pH of 11, and a breakdown viscosity of 0 was reached after approximately more than 2 hours, at about 3 hours reaction time. In any case, it is only at initial moisture level of higher than 1% at which satisfactory breakdown viscosities were realized. The viscosity of the inhibited starch reached a value during the holding period which is comparable to that of the native starch.

FIG. 1 compares viscographs (neutral Brabenders) native Eliane (waxy potato) and inhibited Eliane starch (initial pH 11; initial moisture 6%, reaction time was 3 hours at 165° C. The temperature curves show a holding period around 14 minutes, over which the inhibited starch showed viscostable behaviour ('torque', mPas) and the viscosity of the native potato starch dropped;

Example 2: Inhibition of Waxy Maize or Corn Starch a. Influence Dehydration on the Starting Gelpoint of the Starch.

Procedure 1 and 2 were used to evaluate the dehydration in function of time, at oven and rotavapor conditions. In all cases, the initial moisture level was 10%.

Viscosity was used using the Brabender procedure. Prior to analyses, waxy corn starch samples were suspended in demineralized water, neutralized with acetic acid (1N) and stirred for two hours.

The results are summarized in Table 2 here below:

TABLE 2

Starting gel point as function of dehydration conditions

| Exp. | Initial pH | System | Pressure | Temperature (° C.) | Time (min) | Final moisture level (%) | Starting gel point (° C.) |
|---|---|---|---|---|---|---|---|
| 1 | 10 | — | — | — | — | 10 | 71.1 |
| 2 | 10 | Rotavapor | Atmospheric | 160 | 60 | 1.9 | 71 |
| 3 | 10 | Rotavapor | 50 mBar | 160 | 3 | 1.5 | 69.6 |
| 4 | 10 | Rotavapor | 350 mBar | 160 | 7 | 2 | 70 |
| 5 | 10 | Oven | Atmospheric | 165 | 10 | 1.98 | 70 |
| 6 | 9.5 | oven | Atmospheric | 165 | 10 | 1.3 | 70.5 |

The gelpoints representing the points at which inhibition of the starch was initiated decreased with less than 0.5° C. in case of leg 2. Dehydration conditions of example 2 did not yield a viscostable product according to the invention.

b. Identification of Organic Acids During Dehydration.

HPLC was used to investigate the formation of organic acids in time during dehydration conditions while monitoring moisture content and pH.

The formation of carboxylic acids during dehydration as detected with HPLC is shown in FIG. 2, and shown together with pH in Table 3. Formic acid could be identified as one of the carboxylic acids that is formed during the inhibition reaction. It shows that these carboxylic acids are formed already during certain dehydration conditions according to the invention prior for reaching the anhydrous stadium (<1% moisture) when applying the right conditions.

TABLE 3 pH and water content during dehydration reaction

| Exp. | Reaction time (min) | Moisture content (%) | pH |
|---|---|---|---|
| 1 | 0 | 10.6 | 9.83 |
| 2 | 2 | 7.87 | 9.8 |
| 3 | 5 | 3.51 | 9.75 |
| 4 | 10 | 1.98 | 9.8 |
| 5 | 15 | 0.31 | 9.87 |
| 6 | 25 | 0.18 | 9.62 |

With the amounts of carboxylic acids according to the invention it is needed to monitor the formation of carboxylic acids using HPLC which is more sensitive than pH. pH itself is not conclusive.

A second series of starch inhibition reactions was performed at various conditions, while monitoring for the formation of organic acids. The results are represented in Table 4.

TABLE 4

Inhibition at various dehydration conditions; organic acid formation

| Exp. | Initial pH | System | Pressure | Temperature (° C.) | Initial moisture (%) | Time (min) | Final moisture level (%) | Carboxylic acid formation |
|---|---|---|---|---|---|---|---|---|
| 1 | 10 | Oven | Atmospheric | 160 | 10 | 7 | 2 | Yes |
| 2 | 10 | Rotavapor | 350 mBar | 165 | 10 | 7 | 1.6 | Yes |
| 3 | 10 | Rotavapor | 350 mBar | 165 | 10 | 10 | 1.2 | Yes |
| 4 | 10 | Rotavapor | 50 mBar | 165 | 10 | 3 | 1.5 | Yes |
| 5 | 10 | Rotavapor | Atmospheric | 165 | <1 | — | — | Hardly detectable |
| 6 | 9.5 | Oven | Atmospheric | 160 | 10 | 10 | 1.4 | Yes |
| 7 | 9.4 | Oven | Atmospheric | 160 | 10 | 10 | 1.3 | Yes |

In all cases but experiment 5 there was obtained an inhibited starch with satisfactory viscosity (compared to the native starch peak viscosity) and viscostable behaviour. In experiment 5, at low initial water content, no formic acids were formed and viscosity during the holding period (compared to the native starch peak viscosity) was too low, i.e. significantly below 600 mPas.

c. Inhibition of Corn Starch

The first set of experiments were carried out in an oven, at an initial water content of 12%, and a temperature during treatment of 160° C. The influence of the initial pH was investigated and reported in the table below. For sake of comparison of the added value of the viscosities during the holding period, native starch had a viscosity of 600 mPas.

TABLE 5

Effect of initial pH. Breakdown viscosities and holding period viscosities.

| Exp. | Initial pH | Time (h) | Breakdown viscosity (%) | Viscosity during holding period (mPas) * | Final pH |
|---|---|---|---|---|---|
| Native corn starch | 10 | — | 53 | — | — |
| 1 | 9 | 2 | 14 | — | 7.4 |
| 2 | 9 | 2.5 | 7 | — | 6.9 |
| 3 | 9 | 3 | 0 | 450 | 6.3 |
| 4 | 9.5 | 2 | 6 | — | 7.6 |
| 5 | 9.5 | 2.5 | 0 | 560 | 7.1 |
| 6 | 10 | 1.45 | 0 | 600 | 7.95 |
| 7 | 10 | 2 | 0 | 590 | 7.39 |

* with '—' it is understood that there was no stable viscosity during the holding period Starting with initial pH 9, viscostable behavior could be reached after prolonged reaction time disadvantageously causing lower viscosities during the holding period in combination with a pH below 7 (see exp. 3). From the above sets of experiments it was concluded that visco-stability in combination with a high viscosity during the holding period was achieved with an initial pH of above 9. At an initial pH of 10 the reaction proceeds the fastest in order to achieve visco-stability. For the reactions that started with an initial pH 9.5 and 10, a breakdown viscosity of 0 in combination with a high viscosity during the holding period (compared to the native starch peak viscosity) could be achieved, avoiding a pH drop below 7.

Influence Pressure on Inhibition Reaction.

These experiments were carried out in a rotavapor, and pressure was used as a variable. In all experiments, the initial pH 10, initial water content 12% and temperature during the treatment was 165° C. The results in terms of breakdown viscosities are also listed in table 6:

TABLE 6

Effect of pressure on starch inhibition reaction.

| Exp. | Pressure (mBar) | Time (h) | Final pH | Breakdown Viscosity (%) |
|---|---|---|---|---|
| 1 | Atmospheric | 3 | 6.57 | 26 |
| 2 | 50 | 3 | 7.6 | 12 |
| 3 | 50 | 4 | 7.1 | 0 |
| 4 | 350 | 2.5 | 7.6 | 0 |

It shows the influence of several reduced pressure systems on the dehydration kinetics of the alkaline starch. Pressure could be used to reduce reaction time. Final pH should be controlled (preferably above 7) in order to combine viscostability at a high viscosity level.

C. Comparative Samples; Standard Conditions

Prior to inhibition the samples were dehydrated at 60° C. under vacuum until the moisture level was <1%. The treatment was with initial pH 10 and an initial low water content below 1%. The treatment was carried out in a rotavapor, at atmospheric conditions and at T 165° C.

It was found that after 3 and 4 hours the breakdown viscosity (%) was 20 and 0, respectively. The viscosity during the holding period was 480 mP after 4 hours, and no stable viscosity after 3 hours. The viscosity was thus unsatisfactory low compared to the native starch peak viscosity of 600 mPas. By use of standard conditions, viscostability was reached after prolonged reaction times (>3 hours).

C. Overview Conditions that Lead to Inhibition and High Viscosity During Holding Phase

TABLE 7 summarizing parameters for starch inhibition

| Exp. | Initial pH | Initial moisture (%) | System | Decrease starting gelpoint prior reaching <1% moisture | Formation carboxylic acids | pH prior for reaching 1% moisture | Visco-stability and high viscosity during holding period |
|---|---|---|---|---|---|---|---|
| 1 | 9 | 12 | Oven (atmospheric pressure) | Not available | + | 8.7 | − |

TABLE 7-continued summarizing parameters for starch inhibition

| Exp. | Initial pH | Initial moisture (%) | System | Decrease starting gelpoint prior reaching <1% moisture | Formation carboxylic acids | pH prior for reaching 1% moisture | Visco-stability and high viscosity during holding period |
|---|---|---|---|---|---|---|---|
| 2 | 9.5 | 12 | Oven (atmospheric pressure) | + | + | 9.4 | + |
| 3 | 10 | 12 | Oven (atmospheric pressure) | + | + | 10-9.9 | + |
| 4 | 10 | 12 | Rotavapor (350 mbar) | + | + | 10-9.9 | + |
| 5 | 10 | 12 | Rotavapor (50 mbar) | + | + | 10-9.9 | + |
| 6 | 10 | <1 | Rotavapor (atmospheric) | Not available | <1 ppm | 10-9.9 | − |

From table 7 it can be concluded that viscostability (i.e. a breakdown viscosity of 0%) in combination with a high viscosity during the holding phase (95-100% of the peak viscosity of the original native starch) can be reached when the dehydration conditions are selected such that:

the starting gelpoint of the starch prior to reaching the semi-anhydrous stage (<1% moisture) has decreased at least 0.5° C.;

carboxylic acids (including formic acid) are formed in such a degree that the pH prior for reaching the anhydrous stage is not lower than 9.

The invention claimed is:

1. A process for producing thermally inhibited starch comprising:
   (a) providing alkaline starch having an initial pH, when measured in a 20% (w/v) aqueous dispersion, between 9.1 and 11.2;
   (b) adjusting the water content of the starch to between 5 and 22 wt. %;
   (c) heating the starch having the adjusted water content between 5 and 22 wt. % at a temperature between 120 and 190° C. for at least 30 minutes, forming at least 1 ppm carboxylic acids, while the water content of the starch is maintained above 1 wt. % and the pH is maintained above 9;
   (d) decreasing the water content to less than 1 wt. % and continuing heating the starch until viscostability is achieved, wherein the heating is continued for 0.5 to 3 hours;
   (e) cooling the heat-treated starch and optionally further processing the heat-treated starch.

2. The process according to claim 1, wherein the water content is adjusted to between 5 and 12 wt. %.

3. The process according to claim 2, wherein the water content is adjusted to between 5 and 10 wt. %.

4. The process according to claim 1, in which the initial pH is between 9.5 and 11.

5. The process according to claim 4, in which the initial pH is between 9.5 and 10.5.

6. The process according to claim 1, in which the starch has a starting gel point, and in which by heating the starch before the water content reaches a level of 1 wt. %, the starting gel point of the starch has decreased by at least 0.5° C., compared to the same starch not submitted to the process.

7. The process according to claim 1, wherein the starch is heated at a temperature between 120 and 180° C.

8. The process according to claim 1, wherein the starch is heated with forced water removal.

9. The process according to claim 8, wherein the water is removed with a vacuum or an air blower.

10. The process according to claim 1, wherein the continued heating results in a viscosity of least 90% of the viscosity of native starch.

11. The process according to claim 1, wherein the continued heating results in a viscosity of least 95% of the viscosity of native starch.

12. A process according to claim 1, wherein further processing comprises washing and drying the heat-treated starch.

13. The process according to claim 1, wherein the heat-treated starch has a viscosity during step (c) of least 90% of the viscosity of native starch.

14. The process according to claim 1, which is carried out in a dextriniser, oven, plate dryer, Loedige mixer, or paddle reactor.

15. A starch obtained by the process according to claim 1.

16. A method of thickening providing a pulpy texture to food products, comprising adding a starch according to claim 15 to the food product.

17. The process according to claim 1, wherein the starch is heated at a temperature between 130 and 180° C.

* * * * *

UNITED STATES PATENT AND TRADEMARK OFFICE
CERTIFICATE OF CORRECTION

PATENT NO. : 10,316,107 B2
APPLICATION NO. : 14/427957
DATED : June 11, 2019
INVENTOR(S) : Maurice Karel Hubertina Essers et al.

Page 1 of 1

It is certified that error appears in the above-identified patent and that said Letters Patent is hereby corrected as shown below:

On the Title Page

Item (73), the Assignee should read:
-- STICHTING WAGENINGEN RESEARCH, Wageningen (NL) --

Signed and Sealed this
Ninth Day of June, 2020

Andrei Iancu
*Director of the United States Patent and Trademark Office*